US007708417B2

(12) United States Patent
King

(10) Patent No.: US 7,708,417 B2

(45) Date of Patent: May 4, 2010

(54) AUDIO SPEAKER ILLUMINATION SYSTEM

(76) Inventor: Kristopher C. King, 1400 SW. Walnut, Blue Springs, MO (US) 64105

(*) Notice: Subject to any disclaimer, the term of this patent is extended or adjusted under 35 U.S.C. 154(b) by 149 days.

(21) Appl. No.: 11/750,812

(22) Filed: May 18, 2007

(65) Prior Publication Data

US 2008/0285257 A1 Nov. 20, 2008

(51) Int. Cl.
*H04M 1/22* (2006.01)

(52) U.S. Cl. .................................... 362/86; 340/815.45

(58) Field of Classification Search ................... 362/86; 340/815.45

See application file for complete search history.

(56) References Cited

U.S. PATENT DOCUMENTS

| | | | | |
|---|---|---|---|---|
| 2,150,210 | A * | 3/1939 | Dreyfus | 455/157.1 |
| 2,501,968 | A | 3/1950 | Sassin | |
| 4,811,313 | A | 3/1989 | Tse | |
| 5,163,747 | A | 11/1992 | Cheng | |
| 5,772,307 | A | 6/1998 | Philyaw | |
| 5,802,195 | A * | 9/1998 | Regan et al. | 381/190 |
| 6,000,493 | A | 12/1999 | Chen | |
| 6,158,869 | A | 12/2000 | Barnes, Jr. | |
| 6,563,929 | B2 * | 5/2003 | Kim | 381/117 |
| 2004/0175014 | A1 | 9/2004 | Liu | |
| 2005/0237218 | A1 | 10/2005 | Tang et al. | |

* cited by examiner

*Primary Examiner*—Sandra L O'Shea
*Assistant Examiner*—Jason Moon Han
(74) *Attorney, Agent, or Firm*—Lathrop & Gage LLP

(57) ABSTRACT

An audio system with an illumination mechanism is disclosed. One embodiment includes a device which can be mounted in the center of an audio speaker and used to create an optical effect.

11 Claims, 7 Drawing Sheets

AUDIO SPEAKER ILLUMINATION SYSTEM

BACKGROUND OF THE INVENTION

1. Field of the Invention

The invention relates generally to audio systems and/or lighting.

2. Description of the Related Art

Audio speakers are well known in the art. It is also known to accompany audio speakers with lighting arrangements.

SUMMARY

The present invention is defined by the claims below. Embodiments of the present invention include an illumination member disposed on an audio speaker.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

A combined audio and lighting system is disclosed. Different embodiments for the disclosed system are included in FIGS. 1-16.

Figure 1:
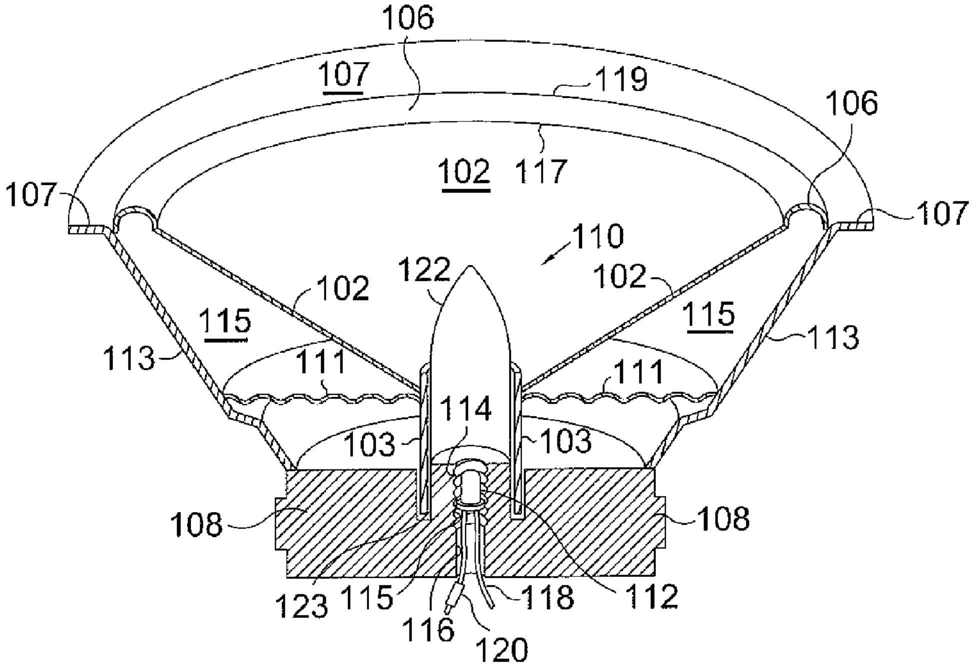
FIG. 1 is a breakout view of one embodiment of the illumination system in use in a speaker.

Referring first to a first embodiment 100 shown in FIG. 1, it can be seen that the system includes a speaker assembly 100. Speaker assembly 100 includes a speaker cone portion 102. Internally, cone portion 102 transitions into a cylindrical portion 103. Cylindrical portion 103, when the speaker is in operation, moves independently from a base portion 108. As is known in the art, cone portions like portion 102 are normally conical and are electromagnetically driven. As shown in the figure, the cone portion 102 is included in a speaker housing 104, commonly referred to as a basket. An outer support disk 107 on speaker housing 104 is flexibly connected to the outer edges of cone portion 102 by a flexible rubber portion 106, also known as the "surround," which enables the cone portion to float in a sense and be vibrated in response to music or other audio. To drive the system, an electromagnet base portion 108 is disposed beneath front and back plates.

In the disclosed embodiment, an 110 illumination device/light guide is provided. This device is shown removed, and in more detail in FIGS. 2A-C. In one embodiment, this device will is adapted such that is capable of being retrofit into existing speaker structures like those shown in FIG. 1. Device 110, however, could be adapted to be attachable to numerous other speaker types. Device 110, in one embodiment, is made of transparent acrylic. Such a device can be constructed fabricated from a Polymethyl methacrylate (PMMA) acrylic rod and then machined to specifications using known processes. But it could also be injection molded.

And although the FIG. 1 embodiment is disclosed as being transparent, it could alternatively be constructed of translucent, partially opaque, or combinations of transparent, translucent, and or opaque. Further, it should be understood that the definition of the term "transparent" as used in this application is not meant to define any particular level of transparency unless otherwise specified. Thus, any degree of transparency, no matter how slight, is included within the intended meaning of this term. The extent of transparency could be minimal, or even substantially transparent and still fall within the meaning intended herein. Additionally, it should be noted that device 110 could alternatively be colored, act as a light filter of any kind, or contain optically active features disposed on its exterior surfaces, or even included in the acrylic when formed.

Also, instead of acrylic, the device could be constructed of other kinds of plastics, and possibly even some glasses or crystals. It could even be constructed of metal and be open ended or in some other kind of light emissive form.

In one embodiment, the arrangement is adapted to create an ornamental effect. By ornamental effect, it is meant that the device 110 creates illumination coming from the speaker area. In some cases, this ornamental effect can be merely the illumination itself. In other instances, it could be some mood enhancing glowing effect. In other embodiments, the ornamental effect could be a unique projection of some sort. Numerous embodiments will be disclosed, and the use of the terms "ornamental effect" should not be construed as requiring some particular arrangement.

As can be recognized in the FIG. 2 embodiment illustrations A-C, device 110 is adapted to receive an LED 112. LEDs are readily commercially available and it is well known in the field that these devices come in many different package sizes. The particular LED selected for the FIG. 2 arrangement has a diameter of 5 millimeters and has an intensity output of 20,000 lumens. There are, of course, numerous other package configurations and sizes. It should be understood that device 110 could easily be adapted to accommodate different LED configurations and sizes. It should also be understood that a color-emitting LED could be selected as LED 112. Almost any color LED exists on the market, or will in the future. Thus, it is contemplated that any color of LED could be selected to serve as LED 112. It is also possible that LED 112 could be a strobe LED, or a color-changing LED. Further, it should also be understood that a device like device 110 could be adapted to accommodate more than one LED, or any combination of LEDs discussed above.

The details of device 110 will now be discussed in more detail. As can best be seen in the FIG. 2A embodiment, the bottommost part of device 110 includes a depending cylindrical depending portion which includes threads. These threads, in one embodiment, are machined to match receiving threads on a conventional, commercially-available speaker. This can be seen by looking back to FIG. 1. The speaker assembly 100 includes receiving threads 115. These threads are conventionally made available with devices like speaker assembly 100 for the purpose of enabling the user to optionally install a simple plug, or instead a more sophisticated tweeter add-on arrangement. Here, the existing threads 115 are used receive threads 114 on device 110 to secure it to the center portion of the speaker 100. Once affixed to the base portion 108, device 110 extends out into the space defined within cone 102 along a center axis location. Because it is fixed to the base 108, device 110 does not move along with cone 102 when the speaker is active.

Aside from the kind of speaker shown in FIG. 1, numerous other speaker arrangements have some sort of equipment at the center of the device. Some of this have similar threaded arrangements like that shown here, but in others, device 110 could be constructed to enable it to be adhered or otherwise fixed to the center of a speaker. In one known alternative discussed later, and shown in FIGS. 17A and B, the already existing speaker plug is attached using a locking arrangement.

Numerous conventional speaker arrangements also provide means to allow electrical power to the LED. With respect to the FIG. 1 arrangement, an axial bore 116 exists through the speaker magnet portion 108. This bore, with this embodiment, is used to give a positive and negative pair of electrical leads 118 access to the LED. In the FIG. 1 embodiment, standard 18 gauge electrical wire is used. Also included with the FIG. 1 arrangement, a resistor 120 is electrically connected to the LED to regulate power consumption, e.g., to avoid power surges, etc.

Figure 2A:
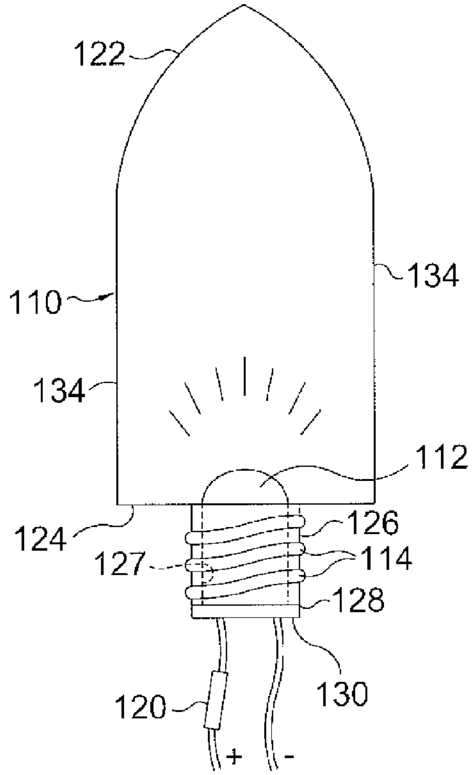
FIG. 2A is a side view of the FIG. 1 embodiment.
Figure 2B:
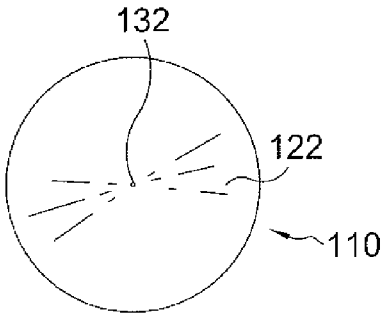
FIG. 2B is a view from the top.

FIGS. 2A-B show the illumination device 110 removed from a speaker system. This enables the details to be seen in more detail. Referring to the figure, we see that device 110 has a shape which is generally cylindrical about its midsection and has an upward portion 122 which is tapered upward to a point 132. The midsection of device 110, although appearing to be substantially cylindrical, thus defining lateral sides 134 when viewed in cross section, is actually slightly tapered. Below that, the device 110 has a flat base portion 124. Extending down from flat base portion 124 is a downwardly extending cylindrical shaft 126 which defines an internal bore 127. Internal bore 127 is substantially cylindrical and sized such that it is adapted to slidably receive an outside diameter 131 of LED 112 such that LED 112. The internal diameter of bore 127 is small enough, however, that a lower surface of the shaft 126 engages a lip 130 on LED 112, preventing the LED moving to far up into the bore 127. It should be noted that in alternative embodiments, LED 112 can either be press fit, permanently adhered, or even integrally manufactured in some fashion. The FIGS. 1-2 embodiment, however, shows a press fit arrangement. This can best be seen by comparing FIG. 2A (which shows the LED fit into place) to FIG. 2C (which shows the LED before insertion).

The FIGS. 1-2 embodiment is substantially solid except for the LED-receiving bore 127. But it should be noted that in other embodiments, the device could be hollow or have some other internal configuration.

In this disclosed embodiment, the shape of the device serves two functions. The first is to create an optical effect. This, in the case of the transparent material could be simple lighting, or some more complex arrangement where, e.g., one or both of the LED 112 and device 110 is colored to create an ambiance creating glow of light. The optical effect will be created in the area of use. For example, were the FIG. 1 system to be used in an automobile audio system, device 110 could be used to project light in the vehicle. With the FIG. 2 embodiment, when like devices are installed in one or more speakers in a vehicle, it can create an ambient lighting effect. This can be done at varying intensities and colors to create whatever overall effect is desired. Further, multiple devices like device 110 could be installed at multiple locations in the vehicle, e.g., at typical factory speaker installation locations (e.g., doors, back dash, back pillars, or other locations). Other lighting effect embodiments will be discussed later.

The second function is related to audio quality. The particular configuration serves to cancel out what would otherwise be colliding, and thus, canceling sound waves at the forward center axial position of the speaker. By preventing wave collision at this central location, distortion is reduced, providing a cleaner sound. Further, the device serves to seal against back-built pressure and it also can have an effect on frequency response. But although the embodiment disclosed in FIGS. 1-2 provides both these functional benefits, alternative embodiments exist which would have less or no real audio effect.

Devices like device 110 can also be installed along with home audio arrangements, e.g., with surround sound types of arrangements, home theaters, or other home audio arrangements in which speakers are used.

In operation, a power source (not shown) is provided. Conventional LEDs operate using DC electricity. Thus, some DC source will normally be desired. For an automobile, DC is readily available. Leads 118 will be tapped into such a source in a known manner. Also, leads 118 could be electrically associated with an interface box (not shown). Interface boxes are known in the art and are able to vary an electrical output based on vibrations which are detected. In audio applications these devices can be used to allow current only when a low frequency (e.g., bass) signal is received. This can be used to create "pulsing" of electrical power to the music. When this type of functionality is incorporated into the illumination system of FIG. 1, a lighting effect can be created that parallels the beat or other musical characteristic.

Figure 3B:
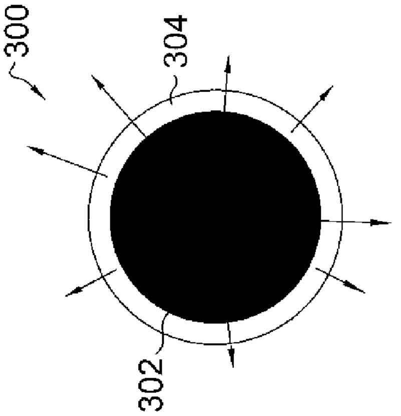
FIGS. 3A and 3B are side and top views, respectively, of another embodiment.
Figure 3A:
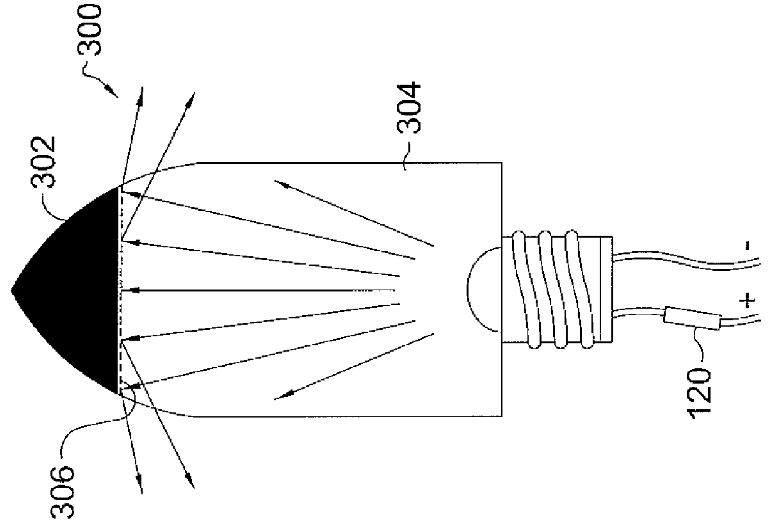
Figure 2C:
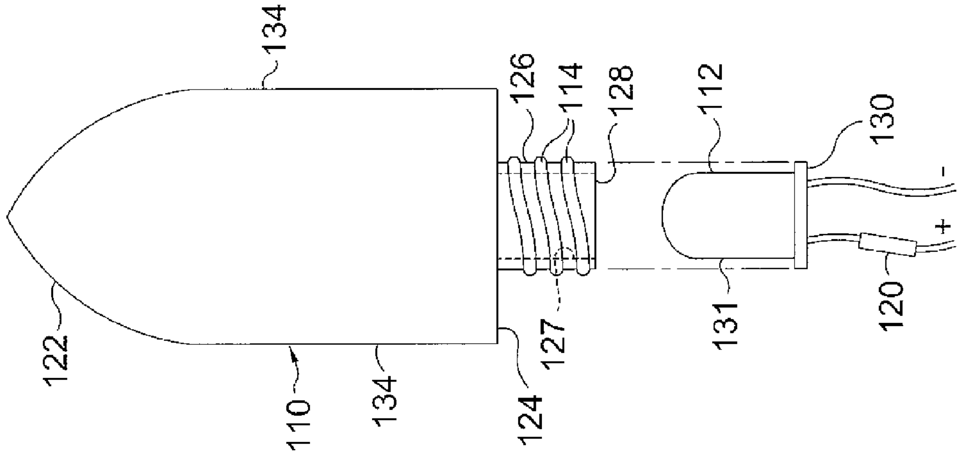
FIG. 2C is a view with the LED removed.

Another embodiment 300 is shown in FIGS. 3A and 3B. This embodiment is similar to the one disclosed in FIGS. 1 and 2, except that instead of the entire device being transparent, this one has a substantially occluding cap portion 302 above a lower area of transparency 304. Cap portion may be constructed of any occluding material (e.g., black acrylic or plastic). In the illustrated FIGS. 3A and 3B versions, the cap 302 defines a reflective border 306 which is the transition plane for the transparent versus occlusive materials used. It should be understood, however, that instead of using an occluding upper material, the cap 302 could instead be configured by painting the outside surfaces of the tip of the device. E.g., black paint could be used. Also, a reflective material could be used at the transition plane 306 which would cause any light to be reflected downward that then back out to maximize the indirect lighting provided out of the speaker. Regardless, this embodiment, by blocking the direct light emitted by the LED creates an indirect lighting effect that is softer than that disclosed in the earlier embodiment.

Figure 4B:
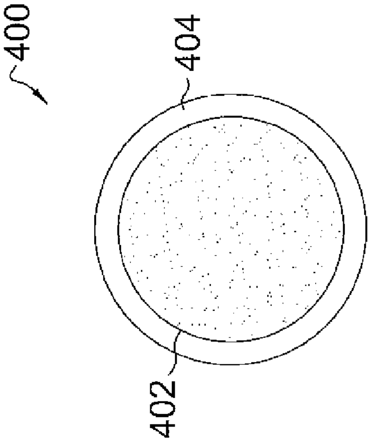
FIGS. 4A and 4B are side and top views, respectively, of yet another embodiment.
Figure 4A:
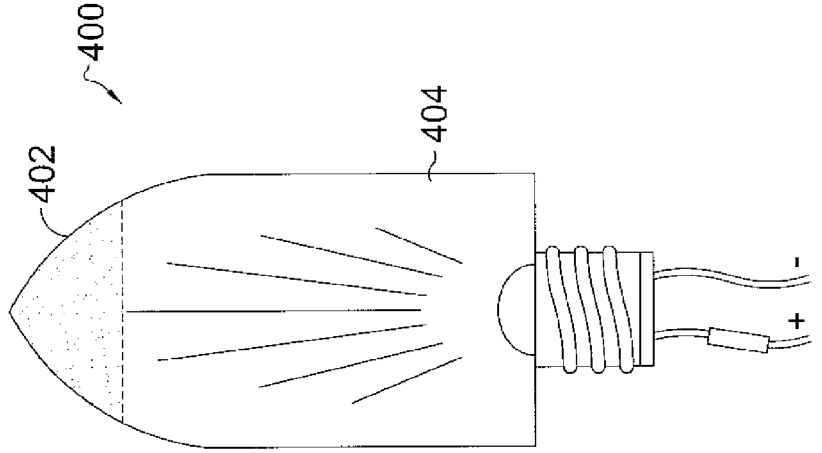
Figure 7A:
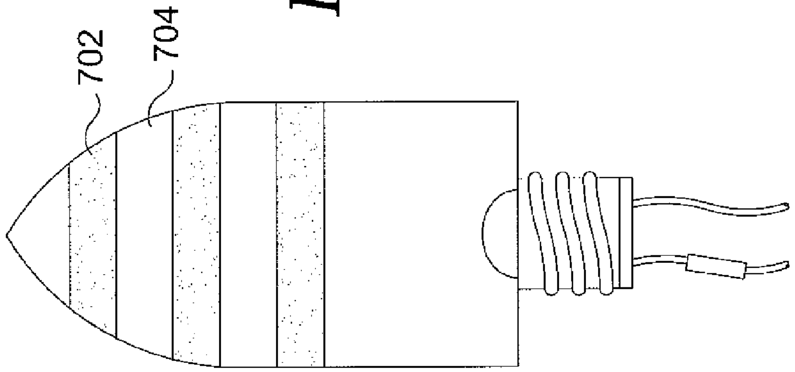
FIGS. 7A and 7B are side and top views, respectively, of yet another embodiment.
Figure 7B:
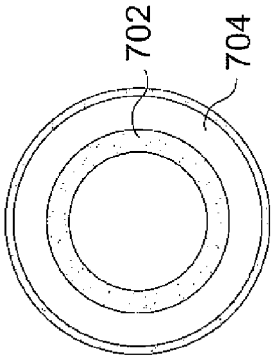
Figure 6A:
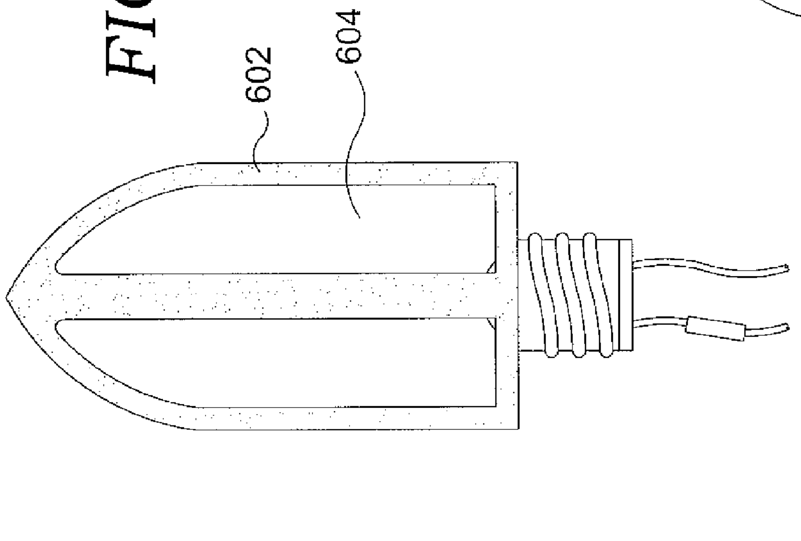
FIGS. 6A and 6B are side and top views, respectively, of yet another embodiment.
Figure 6B:
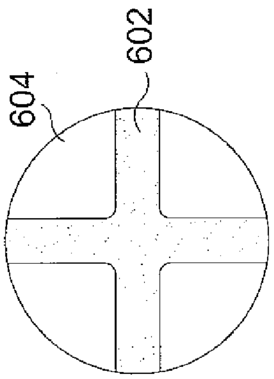
Figure 8A:
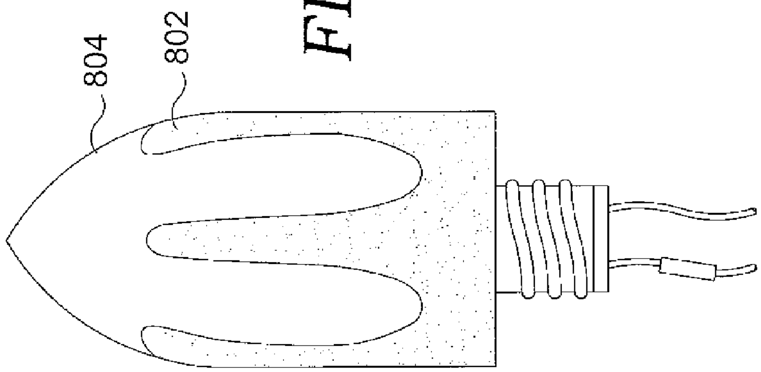
FIGS. 8A and 8B are side and top views, respectively, of yet another embodiment.
Figure 8B:
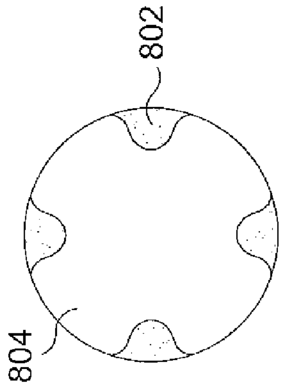
Figure 9A:
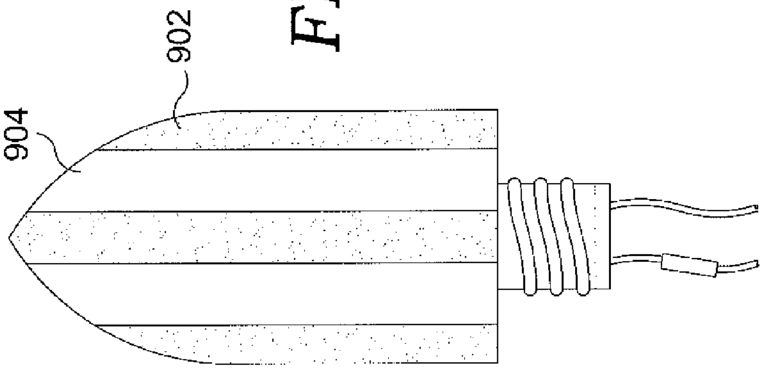
FIGS. 9A and 9B are side and top views, respectively, of yet another embodiment.
Figure 9B:
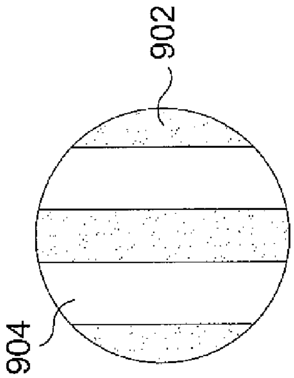
Figure 10:
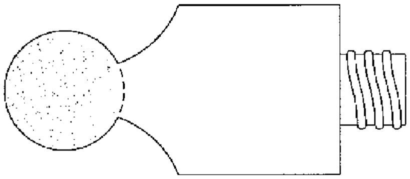
FIGS. 10-16 show further embodiments.
Figure 11:
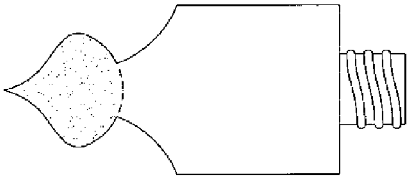
Figure 12:
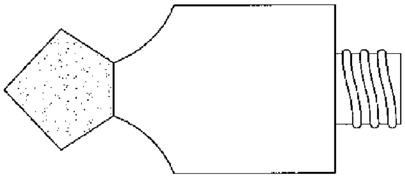
Figure 13:
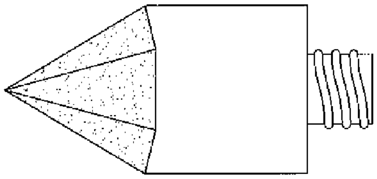
Figure 14:
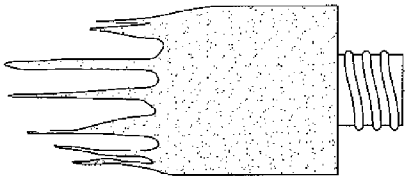
Figure 15:
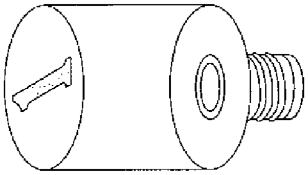
Figure 16:
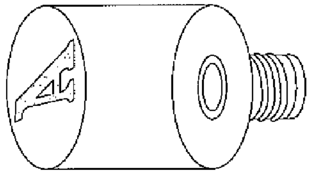

In yet another embodiment 400, a cap portion 402, instead of being occlusive as in the last embodiment, is made to be transparent and colored, as shown in FIGS. 4A and 4B. The colored transparent cap portion 402 is disposed above a lower area of colorless transparency 404. This creates a lighting effect in which the colored or tinted area 402 projects a colored portion surrounded by a white glowing ring which is created by the colorless area 404. It should be understood, however, that area 404 could alternatively be colored to create a two-color effect.

Figure 5A:
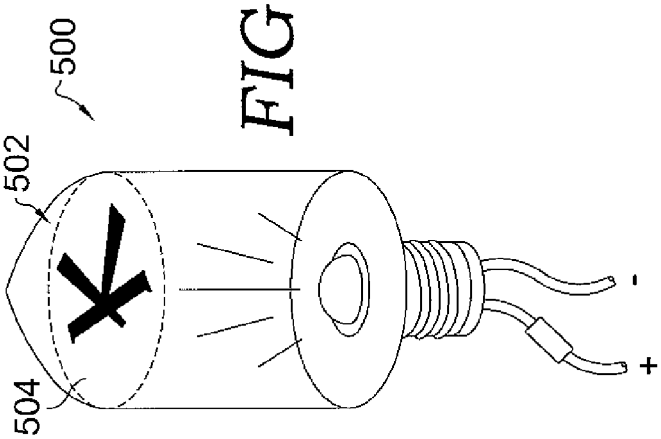
FIGS. 5A and 5B are side and top views, respectively, of yet another embodiment.
Figure 5B:
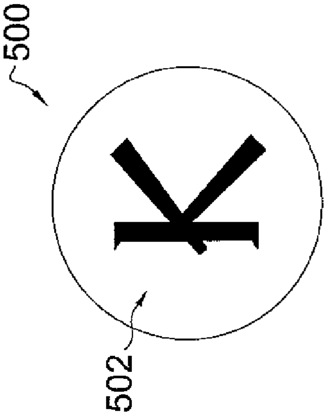

In yet another embodiment 500 shown in FIGS. 5A and 5B, some form of indicia 502 is located at a transition plane 504 in the device. (It should be noted that this and also FIGS. 6-16 all show arrangements with LEDs installed, but the LED leads have been omitted for simplicity sake. One should understand that these embodiments would also include electrical lead arrangements). The transition plane, in one embodiment, exists between separate tip and base portions which are adhered at the plane 504 which is used to sandwich the indicia 502 inside the device. Thus, the indicia appears to float in the transparent device. In one embodiment, the indicia is made of one or more translucent colors, which creates a unique lighting effect when illuminated. More specifically, the device projects the logo into the surrounding environment and can cause a display of the indicia. For example, if the indicia is a trademark, it could be used to associate the audio quality and lighting effects in a vehicle with a particular speaker seller. Further, the indicia could be customized to display novelty information.

FIGS. 6A-6B, 7A-B, 8A-B, and 9A-B all show other alternative embodiments where a colored or tinted portion (e.g., 602, 702, 802, or 902) is disposed on a transparent device (e.g., 604, 704, 804, or 904) to create any of a number of patterns. It should be noted that an alternative arrangement would be to invert the portions which are colored or transparent. For example, portion 602 could be made transparent, and section 604 colored/tinted. And the other embodiments could be inverted as well. Further, portions 602, 702, 802, or 902 could be made to occlude light, instead of being translucent.

FIGS. 10-16 show further embodiments.

Figures 17A, 17B:
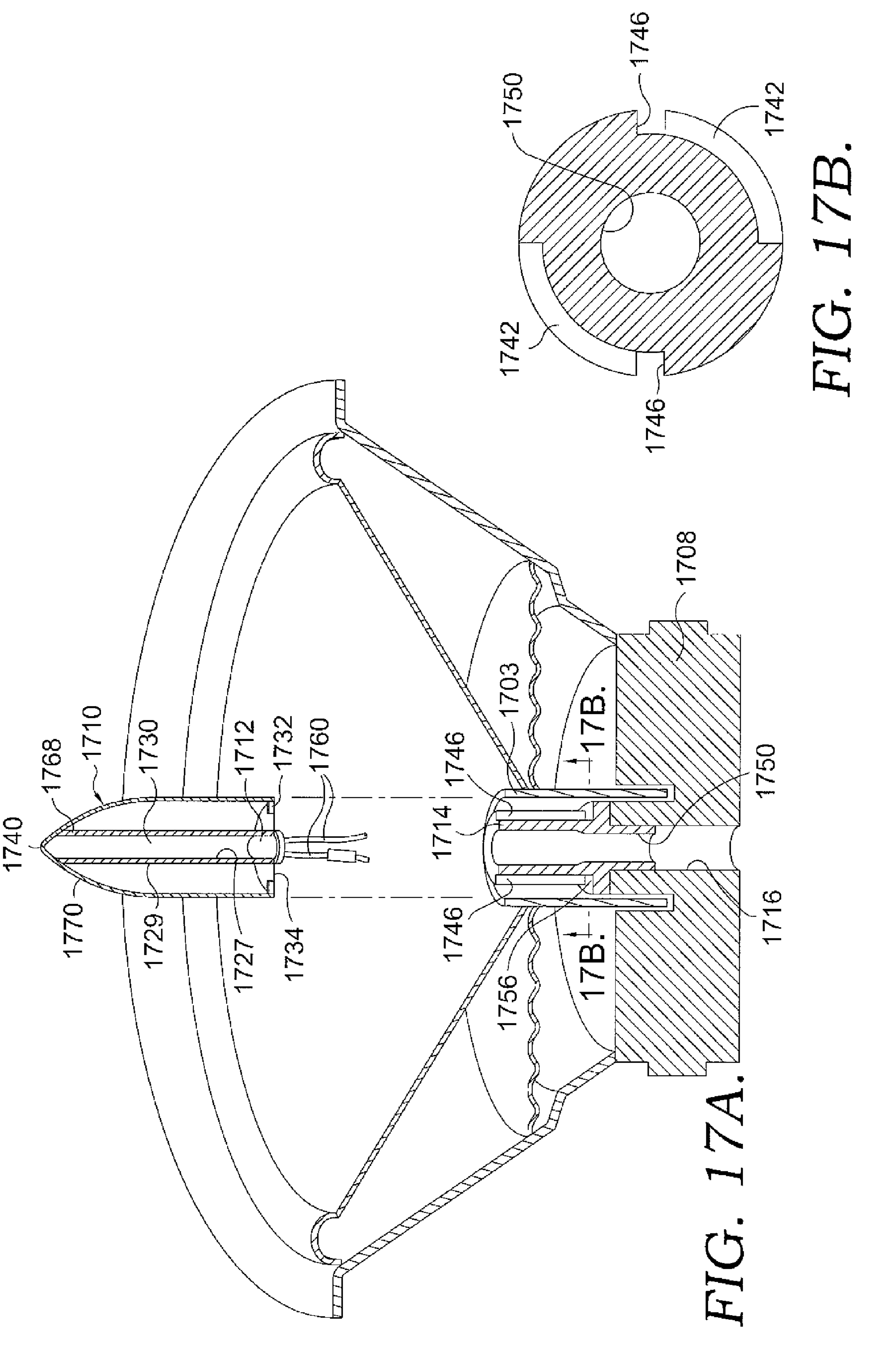
FIGS. 17A and 17B show an alternative embodiment.

FIGS. 17A and B show yet another embodiment in which a device 1710 uses a locking arrangement for attachment rather than using a threaded stem. Many commercially available speakers use speaker plugs which are adapted to be received at a speaker center. In terms of the already existing equipment that is utilized, an augmented receiver 1714 is adhered inside a center bore 1716 in a base portion 1708 of the speaker. Normally, a black opaque plug (not shown) is inserted onto receiver 1714 using a locking arrangement on the plug. The locking arrangement on the plug is not shown here, but would be substantially similar to the one disclosed at the bottom of device 1710 in the FIG. 17A embodiment. More specifically, this arrangement comprises two inwardly projecting tabs which are received into longitudinal grooves 1746 defined in the cylindrical outer surface of the receiver 1714.

The embodiment disclosed in FIGS. 17A and B takes advantage of this existing arrangement on receiver 1714, and provides a retrofit arrangement which enables illumination much like with the last embodiment. Here, a light-transmitting device 1710 (which can be transparent or translucent) has a lower end 1734 which is adapted to be received on the receiver 1714. To accomplish this, two inwardly projecting tabs 1732 are included on the inside surface at the bottom of the insert device 1710. These tabs are receivable into the channels 1746 until the lower surface 1734 of device 1710 engages a landing 1756 on the receiver 1714. Once this happens, the device 1710 can be rotated 45 degrees to lock it in place. This rotation is enabled by two outer annular grooves 1742 which are oppositely disposed and exist only a quarter of the way around the periphery of the device as shown. Thus, when the device is inserted down into the receiver 1714, and then turned clockwise 90 degrees in the direction of groove 1742, the device 1710 is retained in the center of the speaker.

But before installation, device 1710 is provided with an illumination device, which, in this embodiment, is an LED 1712. LED 1712 is inserted into a cylindrical void 1730 in a tube 1768 in device 1710 which has an interior surface 1727 and an exterior surface 1729. Tube 1768, in this embodiment, is constructed of the same translucent or transparent material as is an exterior portion 1770 of the device. But it could, however, be constructed of other transparent or translucent materials. The LED may be press fit, adhered, or otherwise secured. Upon insertion, the leads 1760 pass through opening 1750 after which they can be connected to a source of electricity. Then the device 1710 can be locked in place as discussed above.

It should be understood that the alternative connectivity shown in FIGS. 17A and B could be used equally as will with the particular illumination device designs disclosed in FIGS. 2-16 or numerous other embodiments not specifically disclosed.

As can be seen, many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for use with a conventional audio speaker, said speaker having a sound-generating audio cone, said system comprising:

a light guiding device having a first end and a second end;

said first end including a stem portion, said stem portion being adapted to be threadingly received into a set of internal threads at a center axial area of said conventional speaker;

an axial bore made into said stem portion, said bore located substantially coaxially inside external threads of said stem portion, said bore sized to allow the passage of and securely hold an external diameter of a light source;

said second end being adapted to extend axially outward into a space defined inside said cone, at least a portion of said second end being at least partially one of transparent and translucent; and said device being adapted to receive light from said light source such that said light is transmitted through said portion to ornamentally illuminate an area outside of said speaker.

2. The system of claim 1 wherein said light source is a light emitting diode.

3. The system of claim 1 wherein said second end is tapered.

4. The system of claim 1 wherein said second end is substantially solid.

5. The system of claim 1 wherein a distal portion of said second end is made to be opaque.

6. The system of claim 1 wherein said second end includes a reflector, said reflector opposing an emission direction of said light source to create an indirect lighting effect.

7. The system of claim 1 wherein said second end includes indicia, said indicia optically interacting with said light source to result in a projected image onto surfaces outside and away from said speaker.

8. The system of claim 1 wherein said second end is adapted such that light emitted from said light source first passes through a substantially transparent portion and then at a more distal portion passes through a light filter which causes the tip of said device to emit colored light.

9. The system of claim 1 wherein said device includes a light filtering portion which causes at least a portion of said device to emit colored light.

10. A retrofit device for installation into a commercially-available speaker, said retrofit device comprising:

a body which is one of transparent and translucent;

a substantially cylindrical first end of said body which is adapted to be attached into an already-existing threaded-attachment arrangement at a center axial location of said commercially-available speaker instead of an already-existing body which is intended for installation in said attachment arrangement at said location in said commercially-available speaker, wherein said attachment arrangement includes already-existing receiving threads, and said first end includes reciprocating threads which enables retrofitting;

said first end defined to physically receive and securely hold an LED coaxially inside of said first end;

said LED being oriented such that it is able to transmit light out through at least a portion of said body to illuminate an area in an ornamental fashion.

11. The retrofit device of claim 10 wherein said body is shaped to enhance the audio quality of said speaker.

* * * * *